US010323595B2

(12) United States Patent
Sanborn et al.

(10) Patent No.: US 10,323,595 B2
(45) Date of Patent: Jun. 18, 2019

(54) METHODS AND SYSTEMS FOR DUAL FUEL INJECTION SYSTEM

(71) Applicant: Ford Global Technologies, LLC, Dearborn, MI (US)

(72) Inventors: Ethan D. Sanborn, Saline, MI (US); Joseph Lyle Thomas, Holt, MI (US); Xiaoying Zhang, Dearborn Heights, MI (US); Paul Hollar, Belleville, MI (US); Daniel Dusa, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/714,976

(22) Filed: Sep. 25, 2017

(65) Prior Publication Data

US 2018/0171916 A1    Jun. 21, 2018

Related U.S. Application Data

(60) Provisional application No. 62/437,403, filed on Dec. 21, 2016.

(51) Int. Cl.
| | |
|---|---|
| *F02D 41/14* | (2006.01) |
| *F02D 41/00* | (2006.01) |
| *F02D 41/30* | (2006.01) |
| *F02D 41/22* | (2006.01) |
| *F02P 5/04* | (2006.01) |

(52) U.S. Cl.
CPC ..... *F02D 41/1454* (2013.01); *F02D 41/0002* (2013.01); *F02D 41/221* (2013.01); *F02D 41/3005* (2013.01); *F02D 41/3094* (2013.01); *F02D 2041/001* (2013.01); *F02D 2041/002* (2013.01); *F02D 2041/224* (2013.01); *F02D 2200/1006* (2013.01); *F02D 2250/18* (2013.01); *F02P 5/045* (2013.01); *Y02T 10/42* (2013.01)

(58) Field of Classification Search
CPC .. F02D 41/14; F02D 41/1454; F02D 41/0002; F02D 41/221; F02D 41/3005; F02D 41/3094; F02D 2041/001; F02D 2041/002; F02D 2041/224; F02P 5/045
See application file for complete search history.

(56) References Cited

U.S. PATENT DOCUMENTS

| | | | |
|---|---|---|---|
| 6,513,492 B1 | 2/2003 | Bauerle et al. | |
| 9,057,351 B2 | 6/2015 | Thomas et al. | |
| 9,279,371 B2 | 3/2016 | Fulton | |
| 10,018,143 B2 * | 7/2018 | Ranga | F02D 41/221 |
| 10,018,144 B2 * | 7/2018 | Ranga | F02D 41/2467 |

* cited by examiner

*Primary Examiner* — Hieu T Vo
(74) *Attorney, Agent, or Firm* — Julia Voutyras; McCoy Russell LLP

(57) ABSTRACT

Methods and systems are provided for reducing lean air-fuel ratio excursions due to degradation of a port injector while fueling an engine via each of port and direct injection. During a PFDI mode of engine operation, responsive to an indication of port injector degradation, such as due to circuit or injector power issues, intake airflow is limited by reducing the opening of an intake throttle. Air flow is limited to be based only on the direct injected fuel fraction, and independent of the commanded port injected fuel fraction.

20 Claims, 5 Drawing Sheets

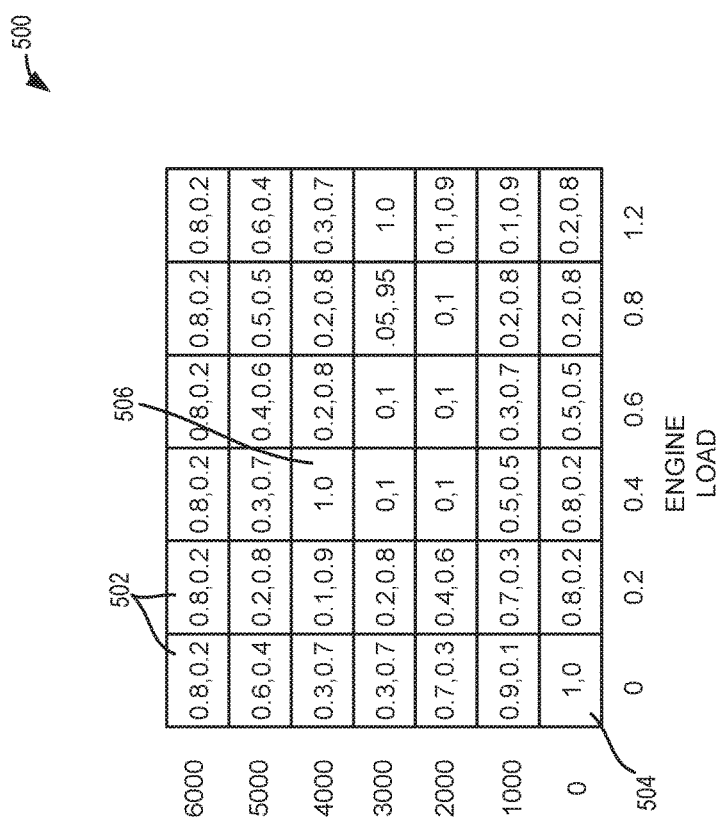

METHODS AND SYSTEMS FOR DUAL FUEL INJECTION SYSTEM

CROSS REFERENCE TO RELATED APPLICATION

The present application claims priority to U.S. Provisional Patent Application No. 62/437,403 entitled "Methods and Systems for Dual Fuel Injection System," filed on Dec. 21, 2016. The entire contents of the above-referenced application are hereby incorporated by reference in its entirety for all purposes.

FIELD

The present application relates generally to systems and methods for adjusting operation of an internal combustion engine having multiple fuel delivery systems to maintain combustion air-fuel ratio.

BACKGROUND/SUMMARY

Engines may be configured to deliver fuel to an engine cylinder using one or more of port and direct injection. Port fuel direct injection (PFDI) engines are capable of leveraging both fuel injection systems. For example, at high engine loads, fuel may be directly injected into an engine cylinder via a direct injector, thereby leveraging the charge cooling properties of the direct injection (DI). At lower engine loads and at engine starts, fuel may be injected into an intake port of the engine cylinder via a port fuel injector, reducing particulate matter emissions. During still other conditions, such as under heavy load, a portion of fuel may be delivered to the cylinder via the port injector while a remainder of the fuel is delivered to the cylinder via the direct injector. During such conditions, fuel is required from both the PFI system and the DI system to maintain a desired combustion air-fuel ratio.

However the inventors herein have identified a potential issue with PFDI systems. If the port fuel injection system stops functioning during engine operation, such as due to port injector circuit issues, the engine may be damaged due to prolonged lean combustion. Specifically, the engine control system may not respond rapidly enough when the port fuel injection system stops functioning while the direct fuel injection system continues to operate to meet the operator torque demand. As a result, engine airflow may continue to be provided based on the total fuel flow to provide engine torque, resulting in a leaner than desired combustion. Prolonged lean combustion can result in misfires and engine damage. In contrast, in PFI only systems, when the port injection system is degraded, there is zero torque in the cylinder and the engine control system is able to respond to the zero torque condition.

In one example, the above issue may be at least partly addressed by a method for an engine comprising: responsive to an indication of port injector degradation, received while fueling a cylinder via each of a port and a direct injector, limiting an intake air flow. In this way, engine degradation due to discontinuation of port fuel injection in a PFDI system may be reduced.

As one example, an engine may be configured with each of port and direct fuel injection capabilities. During conditions when the engine is being fueled via each of port and direct injection, engine air flow may be adjusted based on the total fuel flow from the fuel injectors to provide a desired combustion air-fuel ratio (e.g., stoichiometric air-fuel ratio). Responsive to an indication of degradation of the PFI system, such as due circuit degradation of a single port injector or due to a loss of electrical power to the port injection system, a direct injection fuel schedule may be adjusted, if possible, to compensate for the loss of port injected fuel. For example, a direct injection pulse-width may be extended, if possible, to compensate for at least a portion of the port injected fuel that was supposed to be delivered, thereby providing as much of the torque as possible. In addition, engine air flow may be limited by reducing an opening of an intake throttle and/or via cam timing adjustments. In particular, the engine air flow limit may be determined based on the amount of fuel delivered via direct injection only, while ignoring the desired/commanded port injector flow. For example, the opening of the intake throttle may be reduced to be commensurate with (or a function of) the updated direct injection fuel pulse-width so that the desired combustion air-fuel ratio (e.g., stoichiometric air-fuel ratio) is maintained.

In this way, by limiting an engine air flow in a PFDI engine system responsive to an indication of port injection fuel system degradation, unintended lean combustion may be reduced. By adjusting an intake throttle position based only on the direct injected fuel flow, and independent of the desired (or anticipated) port injected fuel flow, air flow may be appropriately limited responsive to the discontinuation of port injected fuel flow. By limiting the air flow to maintain engine operation at a desired combustion air-fuel ratio despite the degradation of the PFI system, engine performance and life may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an example table of empirically determined port and direct fuel fractions (DI/PFI split ratio).

DETAILED DESCRIPTION

Figure 1:
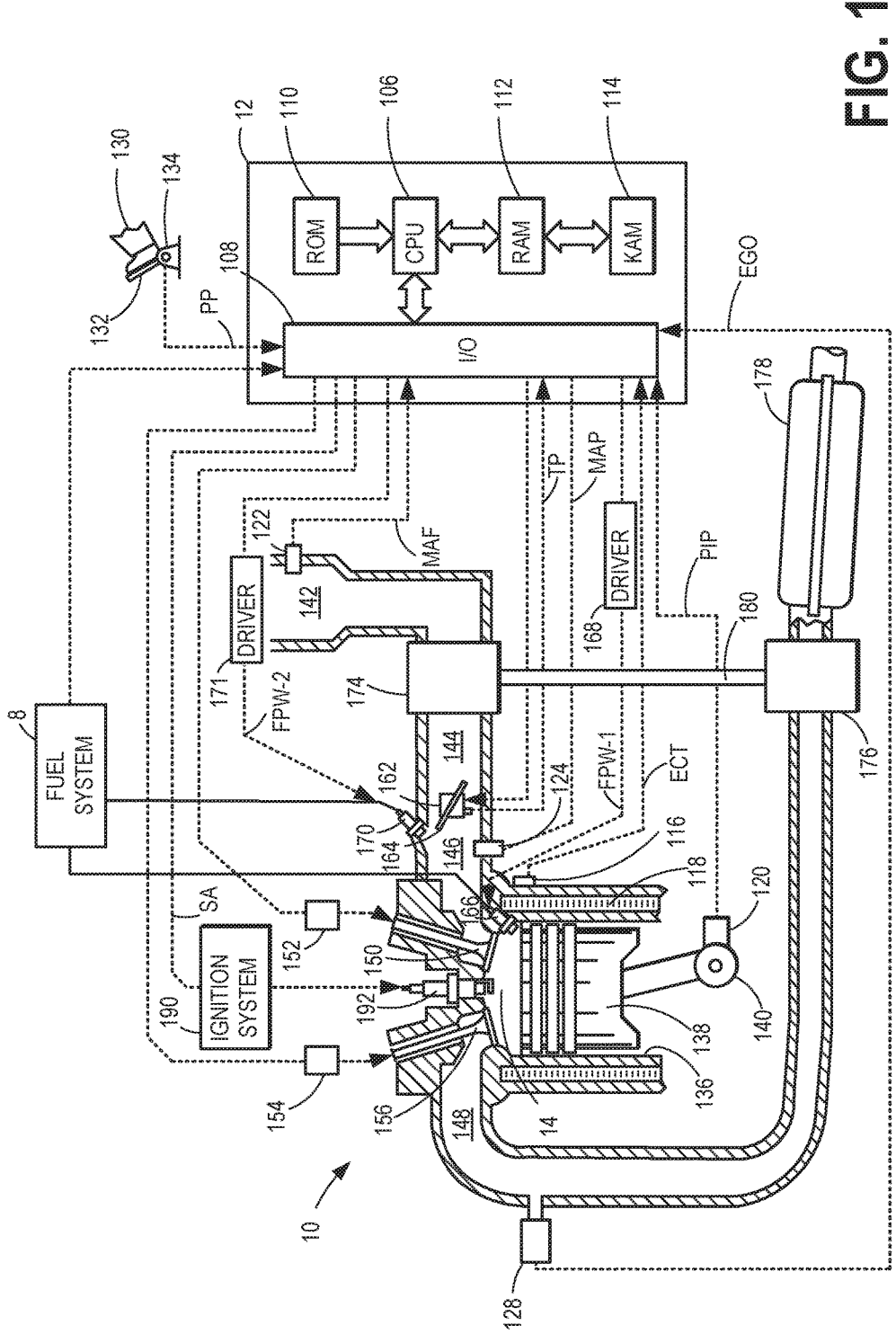
FIG. 1 schematically depicts an example embodiment of a cylinder of an internal combustion engine.
Figure 2:
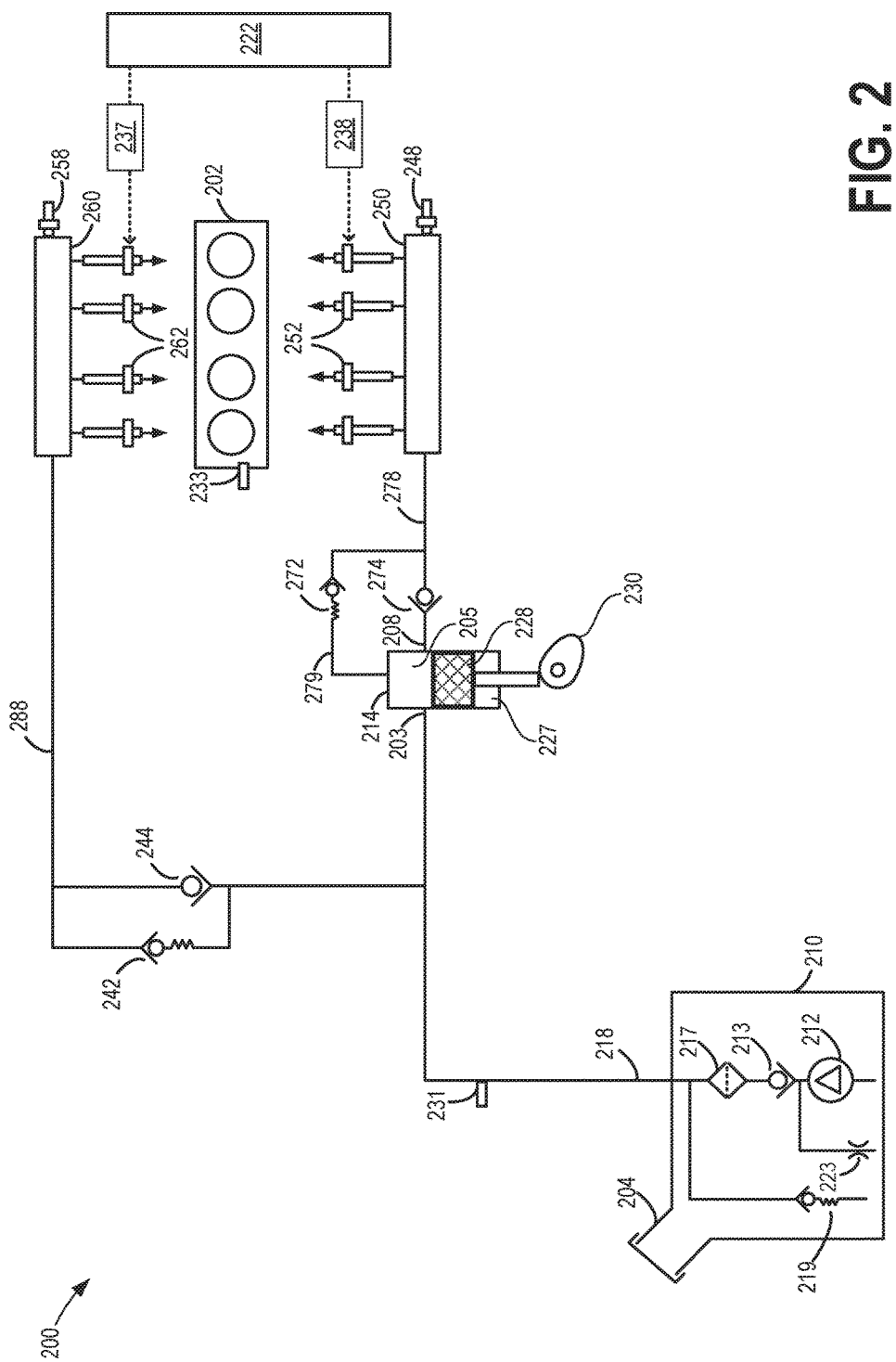
FIG. 2 schematically depicts an example embodiment of a fuel system configured for port injection and direct injection that may be used with the engine of FIG. 1.

The following description relates to systems and methods for adjusting operation of an internal combustion engine configured with each of direct fuel injection and port fuel injection capabilities, such as the example engine system of FIG. 1. An example PFDI fuel system that may be used with the engine system of FIG. 1 is shown at FIG. 2. A split ratio of fuel to be delivered via port injection relative to direct injection may be determined based an engine operating conditions, such as using the engine speed-load table of FIG.

5. During certain engine operating conditions, fuel may be delivered to the engine via each of port and direct injection. In response to an indication of degradation of the PFI system while fueling the engine via each of port and direct injection, an engine controller may perform a routine, such as the example routine of FIG. 3, to limit air flow to the engine as a function of only the direct injected fuel fraction, while disregarding the expected port injected fuel fraction. An example air flow adjustment is shown with reference to FIG. 4. In this way, engine damage due to extended lean combustion may be averted.

Regarding terminology used throughout this detailed description, a high pressure pump, or direct injection pump, may be abbreviated as HPP. Similarly, a low pressure pump, or lift pump, may be abbreviated as a LPP. Port fuel injection may be abbreviated as PFI while direct injection may be abbreviated as DI. Also, fuel rail pressure, or the value of pressure of fuel within a fuel rail, may be abbreviated as FRP.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIG. 2, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. For example, based on a pulse-width signal commanded by the controller to a driver coupled to the direct injector, a fuel pulse may be delivered from the direct injector into a corresponding cylinder.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIG. 2 schematically depicts an example embodiment 200 of a fuel system, such as fuel system 8 of FIG. 1. Fuel system 200 may be operated to deliver fuel to an engine, such as engine 10 of FIG. 1. Fuel system 200 may be operated by a controller to perform some or all of the operations described with reference to the method of FIG. 3.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of port injectors 262 (herein also referred to as a second injector group). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a BOSCH HDP5 HIGH PRESSURE PUMP, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 can be used to provide an indication of engine speed to the controller 222. The indication of engine speed can be used to identify the speed of higher pressure fuel pump 214, since the pump 214 is mechanically driven by the engine 202, for example, via the crankshaft or camshaft.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more port injectors 262 and direct injectors 252. For example, during high load conditions, fuel may be delivered to a cylinder on a given engine cycle via only direct injection, wherein port injectors 262 are disabled. In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled. An example of an engine speed-load table that may be referenced by the controller 222 for determining a fueling schedule is shown with reference to FIG. 5 and described with reference to the method of FIG. 3.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 222 may be used to send a control signal to the low pressure pump, as required, to adjust the output (e.g., speed, flow output, and/or pressure) of the low pressure pump.

During conditions when an engine cylinder is being fueled via each of port and direct injection, port fuel injection system degradation can occur. This may occur, for example, due to loss of electrical power to the PFI system, or due to circuit damage to a single port injector. The engine may, however, continue to be fueled via the direct injector. As elaborated with reference to FIG. 3, during such conditions, an engine air flow may be limited responsive to the loss of PFI fuel flow so as to maintain the combustion air-fuel ratio. By limiting the air flow to be a function of only the direct injected fuel flow, and independent of the port injected fuel flow (actual or anticipated), lean combustion occurrence is reduced.

Figure 3:
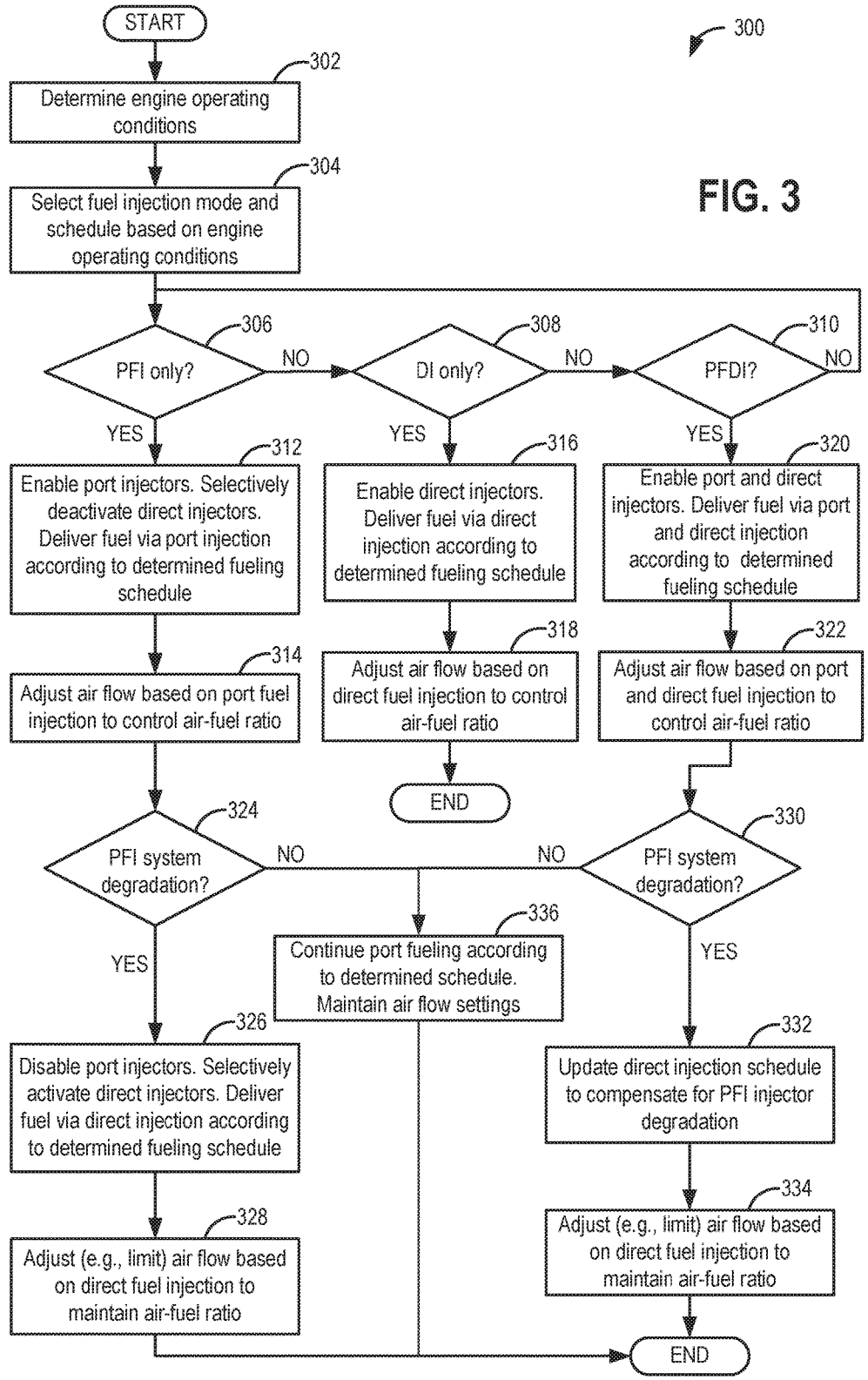
FIG. 3 shows a flow chart illustrating an example method that may be implemented for limiting air flow in a PFDI engine system responsive to degradation of the PFI system.

In this way, the components of FIGS. 1-2 enables an engine system comprising: an engine cylinder; a port injector; a direct injector; an intake throttle; and a controller with computer-readable instructions stored on non-transitory memory for: responsive to an indication of port injector degradation, received while fueling the cylinder via only the port injector, transitioning to fueling the cylinder via only the direct injector; and limiting an intake air flow. For example, the limiting may include reducing an opening of the intake throttle as a pulse-width commanded to the direct injector increases. The limiting may be adjusted to maintain an air-fuel ratio of the cylinder from before the transitioning. In one example, the indication of port injector degradation may include one of degradation of an electrical circuit coupled to the port injector, and loss of electrical power to the port injector. FIG. 3 illustrates an example method 300 for limiting engine air flow responsive to PFI fuel system issues. Instructions for carrying out method 300 may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below. For example, the controller may send a signal to an actuator of the intake throttle of the engine system to limit air flow.

At 302, engine operating conditions may be determined by the controller. The engine operating conditions may include engine load, engine temperature, engine speed, operator torque demand, etc. Depending on the estimated operating conditions, a plurality of engine parameters may be determined. For example, at 304, a fuel injection schedule may be determined. This includes determining an amount of fuel to be delivered to a cylinder (e.g., based on the torque demand), as well as a fuel injection timing. Further, a fuel injection mode and a split ratio of fuel to be delivered via port injection relative to direct injection may be determined for the current engine operating conditions. In one example, at high engine loads, direct injection (DI) of fuel into an engine cylinder via a direct injector may be selected in order to leverage the charge cooling properties of the DI so that engine cylinders may operate at higher compression ratios without incurring undesirable engine knock. If direct injection is selected, the controller may determine whether the fuel is to be delivered as a single injection or split into multiple injections, and further whether to deliver the injection(s) in an intake stroke and/or a compression stroke. In another example, at lower engine loads (low engine speed) and at engine starts (especially during cold-starts), port injection (PFI) of fuel into an intake port of the engine cylinder via a port fuel injector may be selected in order to reduce particulate matter emissions. If port injection is selected, the controller may determine whether the fuel is to be delivered during a closed intake valve event or an open intake valve event. There may be still other conditions where a portion of the fuel may be delivered to the cylinder via the port injector while a remainder of the fuel is delivered to the cylinder via the direct injector. Determining the fuel injection schedule may also include, for each injector, determining a fuel injector pulse-width as well as a duration between injection pulses based on the estimated engine operating conditions.

In one example, the determined fuel schedule may include a split ratio of fuel delivered via port injection relative to direct injection, the split ratio determined from a controller look-up table, such as the example table of FIG. 5. With reference to FIG. 5, a table 500 for determining port and direct fuel injector fuel fractions for a total amount of fuel supplied to an engine during an engine cycle is shown. The table of FIG. 5 may be a basis for determining a mode of fuel system operation (DI only, PFI only, or PFI and DI combined (PFDI)), as elaborated in the method of FIG. 3. The vertical axis represents engine speed and engine speeds are identified along the vertical axis. The horizontal axis represents engine load and engine load values are identified along the horizontal axis. In this example, table cells 502 include two values separated by a comma. Values to the left sides of the commas represent port fuel injector fuel fractions and values to the right sides of commas represent direct fuel injector fuel fractions. For example, for the table value corresponding to 2000 RPM and 0.2 load holds empirically determined values 0.4 and 0.6. The value of 0.4 or 40% is the port fuel injector fuel fraction, and the value 0.6 or 60% is the direct fuel injector fuel fraction. Consequently, if the desired fuel injection mass is 1 gram of fuel during an engine cycle, 0.4 grams of fuel is port injected fuel and 0.6 grams of fuel is direct injected fuel. In other examples, the table may only contain a single value at each table cell and the corresponding value may be determined by subtracting the value in the table from a value of one. For example, if the 2000 RPM and 0.2 load table cell contains a single value of 0.6 for a direct injector fuel fraction, then the port injector fuel fraction is 1−0.6=0.4.

It may be observed in this example that the port fuel injection fraction is greatest at lower engine speeds and loads. In the depicted example, table cell 504 represents an engine speed-load condition where all the fuel is delivered via port injection only. At this speed-load condition, direct injection is disabled. The direct fuel injection fraction is greatest at middle level engine speeds and loads. In the depicted example, table cell 506 represents an engine speed-load condition where all the fuel is delivered via direct injection only. At this speed-load condition, port injection is disabled. The port fuel injection fraction increases at higher engine speeds where the time to inject fuel directly to a cylinder may be reduced because of a shortening of time between cylinder combustion events. It may be observed that if engine speed changes without a change in engine load, the port and direct fuel injection fractions may change.

Returning to FIG. 3, at 306, the method includes determining if a port fuel injection-only (PFI-only) mode has been selected based on the current engine operating conditions. Fuel delivery via only PFI may be requested, for example, during conditions of low engine load and low engine temperature, as well as during engine starts. If a PFI-only mode is selected, at 312, the method includes enabling the port injectors and selectively deactivating the direct injectors. The controller may then deliver fuel to an engine cylinder via the port injectors in accordance with the determined fueling schedule. For example, the controller may command a pulse width corresponding to the determined fuel amount to the port injector (such as port injectors 262 of FIG. 1). A timing of the port injection may be adjusted with reference to an intake valve timing of the cylinder based on whether open valve or closed valve port injection was selected in the determined fueling schedule.

At 314, the method includes adjusting air flow to the engine based on the port fuel injection amount to control the combustion air-fuel ratio. For example, the controller may retrieve a desired combustion air-fuel ratio and then compute a desired air flow as a function of the total amount of fuel delivered via the port injector (e.g., as a function of the port injection pulse-width) that provides the desired air-fuel ratio. In one example, the desired air-fuel ratio includes a stoichiometric air-fuel ratio. The desired air flow may be provided as a desired intake throttle position (e.g., degree of throttle opening) or a desired cam position (e.g., desired VCT timing). In one example, the controller may determine the throttle position pulse width through a determination that directly takes into account the port injection fuel amount or port injection pulse-width and the desired air-fuel ratio, such as increasing the throttle opening with increasing port fuel injection amount for a given air-fuel ratio, increasing the throttle opening with increasing desired air-fuel ratio for a given amount of port injected fuel, or increasing the throttle opening with increasing port fuel injection amount and increasing combustion air-fuel ratio. The controller may alternatively determine the air flow based on a calculation using a look-up table with the inputs being port injection pulse-width and desired air fuel ratio, and the output being intake throttle position that provides the desired air-fuel ratio. As another example, the controller may make a logical determination (e.g., regarding a position of the intake throttle or intake cams) based on logic rules that are a function of the port injection pulse-width and the desired air-fuel ratio. The controller may then generate a control signal that is sent to the intake throttle or the VCT mechanism (or intake cams).

If a PFI-only mode is not selected, at 308, the routine includes determining if a direct fuel injection only (DI-only) mode has been requested. Fuel delivery via only DI may be desirable, for example, during high engine load and/or during conditions of high engine temperature. If a DI-only mode is confirmed, at 316, direct injectors may be enabled while port injectors are maintained disabled. Fuel may then be injected into the engine cylinder via the direct injectors (such as direct injectors 252 of FIG. 1). The controller may adjust an injection pulse-width of the direct injectors in order to provide fuel via the direct injectors according to the determined fueling schedule. For example, the controller may command a pulse width corresponding to the determined fuel amount to the direct injector. A timing of the direct injection may be adjusted with reference to cylinder piston position based on whether intake and/or compression stroke injection was selected, as well as based on the number of injections that were selected per injection cycle in the determined fueling schedule.

At 318, the method includes adjusting air flow to the engine based on the direct fuel injection amount to control the combustion air-fuel ratio. For example, the controller may retrieve a desired combustion air-fuel ratio and then compute a desired air flow as a function of the total amount of fuel delivered via the direct injector (e.g., as a function of the direct injection pulse-width) that provides the desired air-fuel ratio. In one example, the desired air-fuel ratio may include a stoichiometric air-fuel ratio. The desired air flow may be provided as a desired intake throttle position (e.g., degree of throttle opening) or a desired cam position (e.g., desired VCT timing). In one example, the controller may determine the throttle position through a determination that directly takes into account the direct injection fuel amount or direct injection pulse-width and the desired air-fuel ratio, such as increasing the throttle opening with increasing direct fuel injection amount for a given air-fuel ratio, increasing the throttle opening with increasing desired air-fuel ratio for a given amount of direct injected fuel, or increasing the throttle opening with increasing direct fuel injection amount and increasing combustion air-fuel ratio. The controller may alternatively determine the air flow based on a calculation using a look-up table with the inputs being direct injection pulse-width and desired air fuel ratio, and the output being intake throttle position that provides the desired air-fuel ratio. As another example, the controller may make a logical determination (e.g., regarding a position of the intake throttle or intake cams) based on logic rules that are a function of the direct injection pulse-width and the desired air-fuel ratio. The controller may then generate a control signal that is sent to the intake throttle or the VCT mechanism (or intake cams).

If neither the PFI-only nor the DI-only mode is selected, at 310, the routine includes confirming that fuel delivery via both DI and PFI has been requested (herein also referred to as the PFDI mode). If it is determined that fuel delivery via both direction injection and port injection has been selected, at 320, the controller may enable both the port and direct injectors. Further, the controller may send a signal to actuators coupled to each of the direct injector and the port injector of each cylinder to deliver fuel based on the determined fueling schedule. Each injector may deliver a portion of a total fuel injection that is combusted in the cylinder. As described with reference to FIG. 5, a split ratio of fuel delivered via PFI relative to DI may be retrieved from a look-up table and control signals may be sent to the injectors to provide fuel according to the determined split ratio. As such, the distribution and/or relative amount of fuel delivered from each injector may vary based on operating conditions such as engine load, knock propensity, engine speed, exhaust temperature, etc. For example, the controller may command a first pulse width to the direct injector corresponding to a first portion of the total fuel amount to be delivered via direct injection. The controller may also command a second pulse width to the port injector corresponding to a second, remaining portion of the total fuel amount to be delivered via port injection. A timing of the direct injection may be adjusted with reference to cylinder piston position based on whether intake and/or compression stroke injection was selected, as well as based on the number of injections that were selected per injection cycle in the determined fueling schedule. Likewise, a timing of the port injection may be adjusted with reference to intake valve timing based on whether closed or open intake valve injection was selected.

At 322, the method includes adjusting air flow to the engine based on the total fuel injection amount to control the combustion air-fuel ratio. For example, the controller may retrieve a desired combustion air-fuel ratio and then compute a desired air flow as a function of the total amount of fuel delivered via the direct injector and the port injector (e.g., as a function of a sum of the direct injection pulse-width and the port injection pulse-width) that provides the desired air-fuel ratio. In one example, the desired air-fuel ratio includes a stoichiometric air-fuel ratio. The desired air flow may be provided as a desired intake throttle position (e.g., degree of throttle opening) or a desired cam position (e.g., desired VCT timing). In one example, the controller may determine the throttle position through a determination that directly takes into account the total fuel injection amount and the desired air-fuel ratio, such as increasing the throttle opening with increasing total fuel injection amount and increasing combustion air-fuel ratio. The controller may alternatively determine the air flow based on a calculation using a look-up table with the inputs being total fuel injection amount commanded and desired air fuel ratio, and the output being an intake throttle position that provides the desired air-fuel ratio. As another example, the controller may make a logical determination (e.g., regarding a position of the intake throttle or intake cams) based on logic rules that are a function of the total fuel injection amount commanded (or a sum of the direct and port injection pulse-width) and the desired air-fuel ratio. The controller may then generate a control signal that is sent to the intake throttle or the VCT mechanism (or intake cams).

From 314, while operating in the PFI-only mode, the method moves to 324 to determine if there is an indication of PFI system degradation. In one example, PFI system degradation may be indicated responsive to circuit failure of a single port injector. In another example, PFI system degradation may be indicated responsive to loss of electrical power to the PFI system. If PFI system degradation is not indicated, at 336, the method includes continuing to port fuel the cylinder according to the determined schedule and maintaining the air flow settings.

If PFI system degradation is determined, at 326, the method includes disabling the port injectors while selectively activating the direct injectors. The remaining amount of fuel that was supposed to be delivered via port injection is then delivered via direct injection. For example, a direct injection pulse width may be commanded by the controller corresponding to an amount of fuel that should have been delivered via the degraded port injector according to the originally determined fueling schedule. The torque/air flow limiting logic of the controller may be notified that the PFI system has been disabled. If the DI system cannot deliver all the fuel mass, the air flow may be limited to prevent engine damage.

At 328, air flow is adjusted, if required, based on the direct fuel injection to maintain the combustion air-fuel ratio. In one example, air flow settings may be maintained, as originally determined based on the port fuel injection amount, such as when the direct fuel injection amount commanded corresponds to the port fuel injection amount that was originally commanded. That is, when the direct fuel injection is able to fully compensate for the lack of port fuel injection, air flow settings may be maintained and no air-fuel ratio excursion may occur. In another example, air flow may be limited based on the direct fuel injection amount, such as when the direct fuel injection amount commanded is less than the corresponding port fuel injection amount that was originally commanded. That is, when the direct fuel injection is not able to fully compensate for the lack of port fuel injection, air flow may be limited to reduce the occurrence of a lean air-fuel ratio excursion. Limiting air flow may include reducing the opening of an intake throttle or adjusting VCT timing to vary intake cam timing, thereby reducing intake air flow. For example, the controller may send a signal to the intake throttle actuator to move the throttle to a less open position based on the commanded direct fuel injection amount.

In one example, the controller may determine the updated throttle position corresponding to the limited air flow through a determination that directly takes into account the direct fuel injection amount, such as increasing the throttle opening to a position as the direct fuel injection amount increases. Alternatively, the controller may decrease the throttle opening from an original opening based on a difference between the commanded direct injection amount relative to the originally determined port injection amount, the throttle opening reduced further as the difference increases. The controller may alternatively update the air flow based on a calculation using a look-up table with the inputs being direct fuel injection amount commanded, and the output being an intake throttle position that provides the desired air-fuel ratio. As another example, the controller may make a logical determination (e.g., regarding a position of the intake throttle or intake cams) based on logic rules that are a function of the direct fuel injection amount commanded and the desired air-fuel ratio. The controller may then generate a control signal that is sent to the intake throttle or the VCT mechanism (or intake cams).

If the DI fueling schedule were not adjusted to compensate for the loss of port fuel injection, the engine would have generated zero torque due to port fuel system degradation. Responsive to the zero torque, air flow would have been immediately stopped by the controller. For example, the throttle would have been closed. For example, if the DI fueling schedule was not updated, then the engine would still generate torque but the combustion would be very lean. This lean combustion could very quickly result in engine damage. If the lack of PFI fuel mass was so severe that the engine did not produce torque, then the throttle would be opened as the torque strategy attempts to match the desired torque to the actual torque the engine is producing.

Returning to 322, while operating in the PFDI mode with fuel being delivered via each of port and direct injection, the method moves to 330 to determine if there is an indication of PFI system degradation. In one example, PFI system degradation may be indicated responsive to circuit failure of a single port injector. In another example, PFI system degradation may be indicated responsive to loss of electrical power to the PFI system. If PFI system degradation is not indicated, the method moves to 336 to continue port and direct fueling the cylinder according to the determined schedule and maintaining the air flow settings.

If PFI system degradation is determined, at 332, the method includes disabling the port injectors while updating the direct injection fuel schedule to immediately compensate for PFI injector degradation. The remaining amount of fuel that was supposed to be delivered via port injection is then delivered via direct injection. For example, the controller may send a signal to extend the direct injection pulse width by an amount corresponding to the amount of fuel that remains to be delivered via the degraded port injector according to the originally determined fueling schedule. Alternatively, the direct injection schedule may be updated to meet the operator torque demand, as much as possible, following degradation of the port injector. It will be appreciated that the updated direct injection fuel schedule may not be able to fully compensate for the lack of port injection due to a timing of the direct fueling relative to a timing of the port fueling in a fueling cycle. For example, if the DI injectors are only sized to provide 70% of the fuel mass required when the engine is operating at high engine speed and high load, then the DI injectors will not be capable of flowing enough fuel. Therefore the air mass needs to be quickly limited to prevent any engine damage. Additionally, the PFI injector is designed to basically inject for a total of 720 degs (during open and closed intake valve), but the DI injector can only inject from intake valve opening and is then limited by spark timing. That is, the DI injection window is much smaller than the PFI injection window.

At 334, the method includes adjusting, specifically, limiting intake air flow based on the updated direct fuel injection schedule and independent of the originally determined port injection schedule so as to reduce the possibility of a lean air-fuel ratio excursion. For example, air flow may be limited based on the updated direct fuel injection amount. That is, since the direct fuel injection is not able to fully compensate for the lack of port fuel injection, air flow is limited to reduce the occurrence of a lean air-fuel ratio excursion. Limiting air flow may include reducing the opening of an intake throttle or adjusting VCT timing to vary intake cam timing, thereby reducing intake air flow. For example, the controller may send a signal to the intake throttle actuator to move the throttle to a less open position based on the updated direct fuel injection amount.

In one example, the controller may determine the updated throttle position corresponding to the limited air flow through a determination that directly takes into account the direct fuel injection amount, such as increasing the throttle opening to a position as the direct fuel injection amount increases. Alternatively, the controller may decrease the throttle opening from an original opening based on a difference between the commanded direct injection amount relative to the originally determined total fuel injection amount, the throttle opening reduced further as the difference increases. The controller may alternatively update the air flow based on a calculation using a look-up table with the inputs being the direct fuel injection amount commanded (and not the port fuel injection amount that was originally commanded), and the output being an intake throttle position that provides the desired air-fuel ratio. As another example, the controller may make a logical determination (e.g., regarding a position of the intake throttle or intake cams) based on logic rules that are a function of the updated direct fuel injection amount commanded and the desired air-fuel ratio. The controller may then generate a control signal that is sent to the intake throttle or the VCT mechanism (or intake cams). It will be appreciated that the controller will ignore the originally commanded port fuel injection amount responsive to the indication of port fuel system degradation.

For example, at both 328 and 334, the controller may adjust one or more engine operating parameters based on a torque deficit between actual engine torque with the reduced intake throttle opening (or limited air flow) and commanded torque. As an example, the adjusting may include one or more of lowering an alternator set point, disabling vehicle air conditioning, and advancing spark timing towards MBT (to provide less spark reserve).

In contrast to the PFI only mode where loss of port fuel injection results in zero torque, in the PFDI mode, the loss of port fuel injection does not result in zero torque, and therefore the controller would not close the throttle. If the control system compensated for the reduced torque by increasing the throttle position (to increase airflow and therefore increase torque), the result would have been a lean air-fuel ratio excursion with no significant rise in torque. In the present example, by increasing the direct fuel injection amount responsive to the indication of port fuel injection degradation, torque errors are reduced. By then limiting the intake air flow based on the direct injection amount, and independent of the originally commanded port injection amount, lean combustion is averted. As such, prolonged lean combustion could degrade engine performance and potentially lead to engine damage.

Figure 4:
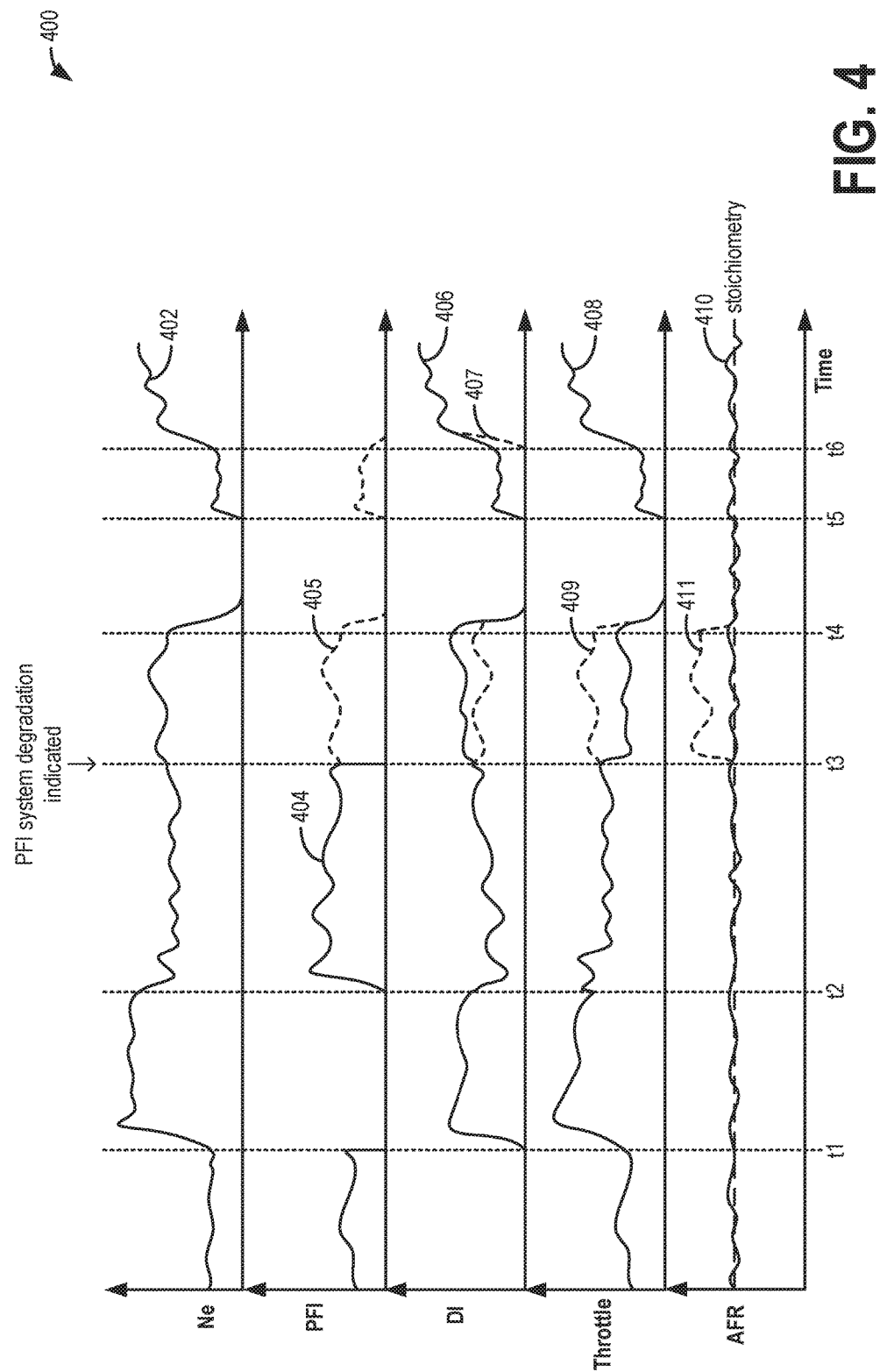
FIG. 4 shows example air flow adjustments in a PFDI engine system to reduce port injector degradation induced air-fuel ratio errors.

An example fuel and air flow adjustment is shown at FIG. 4. Map 400 depicts an engine speed profile at plot 402, fueling of a cylinder via port injection at plot 404, fueling of the same cylinder via direct injection at plot 406, intake throttle position at plot 408, and combustion air-fuel ratio (AFR) relative to stoichiometry at plot 410.

In the depicted example, prior to t1, based on engine operating conditions (e.g., low engine speed-load region), the engine cylinder may be receiving fuel via only port injection while direct fuel injection is selectively disabled (plots 402, 404). That is, the cylinder is operating in the PFI-only mode. Throttle opening is adjusted as a function of the port fuel injection amount (plot 408) so as to operate the cylinder with a combustion air-fuel ratio (plot 410) at or around stoichiometry (dashed horizontal line).

At t1, there is an increase in driver demand responsive to which the engine moves to a higher speed-load region where there is a higher likelihood of knock. In this speed-load region, the engine is fueled via direct injection only. Thus between t1 and t2, the engine cylinder may be receiving fuel via only direct injection while port fuel injection is selectively disabled (plots 402, 404). That is, the cylinder is operating in the DI-only mode. Throttle opening is adjusted as a function of the direct fuel injection amount (plot 408) so as to continue operating the cylinder with a combustion air-fuel ratio at or around stoichiometry.

At t2, there is a decrease in driver demand responsive to which the engine moves to a mid-engine speed-load region. In this speed-load region, the engine is fueled via each of port and direct fuel injection with a split ratio of port injected fuel to direct injected fuel determined based on the engine speed and the engine load. That is, the cylinder is operating in a PFDI mode. In this example, the cylinder is fueled with a split ratio having a higher ratio of port injected fuel to direct injected fuel, the ratio varying as the engine speed-load and driver torque demand varies. Throttle opening is adjusted as a function of the total fuel injection amount (sum of port and direct injected fuel amounts) so as to operate the cylinder with a combustion air-fuel ratio at or around stoichiometry.

At t3, while operating with each of port and direct injected fuel, it may be determined that the PFI fuel system is degraded. The degradation may have occurred due to, for example, a circuit issue or electrical power issue with the port injector. As a result of the degradation, there is an immediate drop in the amount of port fuel delivered to the cylinder (plot 404, solid line), even though the commanded amount is higher (plot 405, dashed line). To compensate for the lack of port injected fuel and meet the operator torque demand, at t3, the direct injected fuel amount is increased (plot 406, solid line) relative to the originally scheduled amount (plot 407, dashed line). However, in the depicted example, the increase in direct injection fuel amount is less than the loss on port injection fuel amount. That is, the updated direct injection pulse width is not able to fully compensate for the loss of the port fuel injection. As such, if the throttle opening were maintained in accordance with the original fuel schedule (dashed plot 409), the cylinder would operate leaner than intended, as indicated by the lean air-fuel ratio excursion at dashed plot 411. Extended lean combustion could degrade engine performance and reduce engine life.

To address this issue, responsive to the indication of port fuel system degradation, at t3, intake air flow is limited. Specifically, throttle opening is decreased to limit air flow as a function of only the updated direct injected fuel amount (plot 406) and not based on the originally commanded port injected fuel amount (plot 405). By limiting the air flow as a function of only the direct injected fuel amount, the combustion air-fuel ratio is maintained at or around the desired air-fuel ratio (stoichiometry, in this case).

At t4, an engine shutdown command is received. Responsive to the shutdown request, cylinder fueling is disabled and the engine starts spinning down to rest. In addition, throttle opening is decreased to a fully closed position.

At t5, an engine restart command is received. Responsive to the restart request, cylinder fueling is re-enabled. At the low engine speed-load of the restart conditions, only port injection of fuel is desired, as indicated at dashed plot 405, and no direct injected fuel is desired. However, due to the degradation of the PFI system (indicated at t3), it is not possible to deliver fuel via port injection. Therefore at t5, fuel is delivered via only direct injection. The direct injection pulse width and fuel amount is adjusted to compensate for all of the desired port injection fuel amount.

That is, the direct injection pulse width is able to fully compensate for the loss of the port fuel injection and meet the operator torque demand at the restart.

Throttle opening is adjusted as a function of the direct injected fuel amount (which in this case is the same of as the originally intended port injection fuel amount) so as to operate the cylinder with a combustion air-fuel ratio at or around stoichiometry.

At t6, there is an increase in driver demand responsive to which the engine moves to a higher speed-load region where there is a higher likelihood of knock. In this speed-load region, the engine is fueled via direct injection only. Thus after t6, the engine cylinder may be receiving fuel via only direct injection. Throttle opening is adjusted as a function of the direct fuel injection amount so as to continue operating the cylinder with a combustion air-fuel ratio at or around stoichiometry.

In this way, lean air-fuel ratio excursions in a PFDI engine system resulting from the sudden degradation of a PFI system component can be averted. By adjusting a direct injected fuel amount responsive to the degradation of the port injection system, engine torque may continue to be generated. By limiting intake air flow as a function of only the direct injected fuel, while ignoring the commanded port fuel injection, engine damage due to extended lean engine operation is reduced.

One example method for an engine comprises: responsive to an indication of port injector degradation, received while fueling a cylinder via each of a port and a direct injector, limiting an intake air flow. In the preceding example, the method additionally or optionally further comprises, responsive to the indication, increasing an amount of fuel delivered via the direct injector. In any or all of the preceding examples, additionally or optionally, limiting the intake air flow includes reducing an intake throttle opening. In any or all of the preceding examples, additionally or optionally, the limiting is based only on an amount of fuel being delivered to the cylinder via the direct injector. In any or all of the preceding examples, additionally or optionally, the limiting is independent of the amount of fuel being delivered to the cylinder via the port injector. In any or all of the preceding examples, additionally or optionally, the limiting the intake air flow includes adjusting a variable cam timing. In any or all of the preceding examples, additionally or optionally, the limiting is adjusted to maintain a combustion air-fuel ratio from before the indication. In any or all of the preceding examples, additionally or optionally, the indication of port injector degradation includes indication of degradation of a circuit coupled to the port injector. In any or all of the preceding examples, additionally or optionally, the indication of port injector degradation includes indication of loss of electrical power to the port injector. In any or all of the preceding examples, additionally or optionally, the method further comprises adjusting one or more engine operating parameters based on a torque deficit between actual torque with the limited air flow and commanded torque.

Another example method for an engine comprises: fueling a cylinder via each of a port and a direct injector while operating at an air-fuel ratio; and responsive to loss of electrical power to the port injector, continuing to fuel the cylinder via the direct injector while reducing an intake throttle opening to maintain the air-fuel ratio.

Another example method for an engine comprises: responsive to an indication of port injector degradation, received while fueling a cylinder via only a port injector, fueling the cylinder via only a direct injector and limiting an intake air flow.

Another example method for an engine comprises: fueling a cylinder via each of a port and a direct injector while operating at an air-fuel ratio; and responsive to loss of electrical power to the port injector, continuing to fuel the cylinder via the direct injector while maintaining the air-fuel ratio. In the preceding example, additionally or optionally, maintaining the air-fuel ratio includes reducing an intake throttle opening to maintain the air-fuel ratio. In any or all of the preceding examples, additionally or optionally, the method further comprises, responsive to loss of electrical power to the port injector while fueling the cylinder via only the port injector, increasing cylinder fueling via the direct injector while reducing the intake throttle opening to maintain the air-fuel ratio from before the loss of electrical power. In any or all of the preceding examples, additionally or optionally, the intake throttle opening is reduced based only on an amount of fuel being delivered to the cylinder via the direct injector. In any or all of the preceding examples, additionally or optionally, the method further comprises adjusting one or more engine operating parameters based on a torque deficit between actual engine torque with the reduced intake throttle opening and commanded torque. In any or all of the preceding examples, additionally or optionally, the adjusting includes one or more of electrical load shedding (including lowering an alternator set point, and disabling air conditioning), and advancing spark timing to or towards MBT (to run the engine with less spark reserve).

Another example engine system comprises: an engine cylinder; a port injector; a direct injector; an intake throttle; a controller with computer-readable instructions stored on non-transitory memory for: responsive to an indication of port injector degradation, received while fueling the cylinder via only the port injector, transitioning to fueling the cylinder via only the direct injector; and limiting an intake air flow. In the preceding example, additionally or optionally, the limiting includes reducing an opening of the intake throttle as a pulse-width commanded to the direct injector increases. In any or all of the preceding examples, additionally or optionally, the limiting is adjusted to maintain an air-fuel ratio of the cylinder from before the transitioning. In any or all of the preceding examples, additionally or optionally, the indication of port injector degradation includes one of degradation of an electrical circuit coupled to the port injector, and loss of electrical power to the port injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
   an engine cylinder;
   a port injector;
   a direct injector;
   an intake throttle;
   a controller with computer-readable instructions stored on non-transitory memory for:
      responsive to an indication of port injector degradation, received while fueling the cylinder via only the port injector,
      transitioning to fueling the cylinder via only the direct injector; and
      limiting an intake air flow.

2. The system of claim 1, wherein the limiting includes reducing an opening of the intake throttle as a pulse-width commanded to the direct injector increases.

3. The system of claim 1, wherein the limiting is adjusted to maintain an air-fuel ratio of the cylinder from before the transitioning.

4. The system of claim 1, wherein the indication of port injector degradation includes one of degradation of an electrical circuit coupled to the port injector and loss of electrical power to the port injector.

5. A method for an engine, comprising:
   determining engine operating conditions;

selecting fuel injection mode and schedule based on the determined engine operating conditions;

adjusting air flow based on total fuel flow; and responsive to an indication of port injector degradation, received while fueling a cylinder via each of a port injector and a direct injector, limiting an intake air flow.

6. The method of claim 5, further comprising, responsive to the indication, increasing an amount of fuel delivered via the direct injector.

7. The method of claim 5, wherein limiting the intake air flow includes reducing an intake throttle opening.

8. The method of claim 5, wherein the limiting is based only on an amount of fuel being delivered to the cylinder via the direct injector.

9. The method of claim 5, wherein the limiting is independent of an amount of fuel being delivered to the cylinder via the port injector.

10. The method of claim 5, wherein limiting the intake air flow includes adjusting a variable cam timing.

11. The method of claim 5, wherein the limiting is adjusted to maintain a combustion air-fuel ratio from before the indication.

12. The method of claim 5, wherein the indication of port injector degradation includes indication of degradation of a circuit coupled to the port injector.

13. The method of claim 5, wherein the indication of port injector degradation includes indication of loss of electrical power to the port injector.

14. The method of claim 5, further comprising, adjusting one or more engine operating parameters based on a torque deficit between actual torque with the limited intake air flow and commanded torque.

15. A method for an engine, comprising:

fueling a cylinder via each of a port injector and a direct injector while operating at an air-fuel ratio; and responsive to loss of electrical power to the port injector, continuing to fuel the cylinder via the direct injector while maintaining the air-fuel ratio.

16. The method of claim 15, wherein maintaining the air-fuel ratio includes reducing an intake throttle opening to maintain the air-fuel ratio.

17. The method of claim 16, further comprising, responsive to loss of electrical power to the port injector while fueling the cylinder via only the port injector, increasing cylinder fueling via the direct injector while reducing the intake throttle opening to maintain the air-fuel ratio from before the loss of electrical power.

18. The method of claim 17, wherein the intake throttle opening is reduced based only on an amount of fuel being delivered to the cylinder via the direct injector.

19. The method of claim 17, further comprising, adjusting one or more engine operating parameters based on a torque deficit between actual engine torque with the reduced intake throttle opening and commanded torque.

20. The method of claim 19, wherein the adjusting includes one or more of lowering an alternator set point, disabling vehicle air conditioning, and advancing spark timing towards MBT.

* * * * *